Sept. 18, 1956     J. P. FULLAM ET AL     2,763,449
STEERING MECHANISM

Filed Nov. 16, 1955     2 Sheets-Sheet 1

INVENTORS
John Peter FULLAM &
Stephan GYURIK
BY
ATTORNEYS

Sept. 18, 1956         J. P. FULLAM ET AL         2,763,449
                        STEERING MECHANISM
Filed Nov. 16, 1955                          2 Sheets-Sheet 2
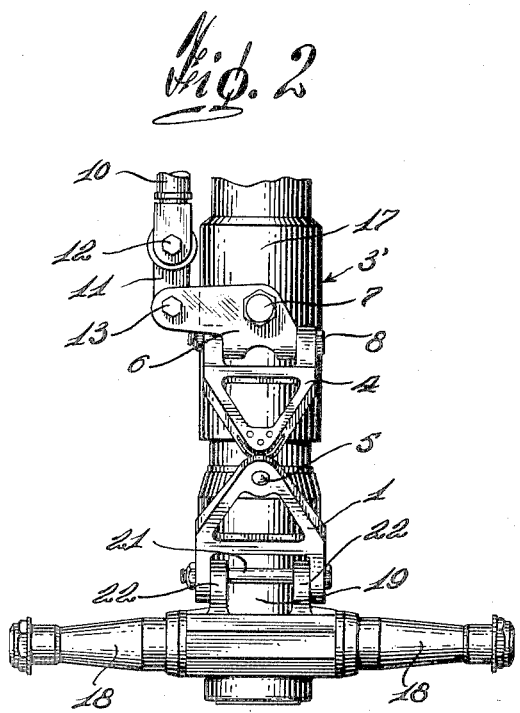
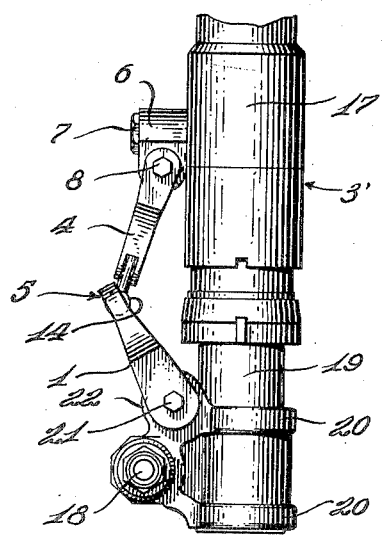
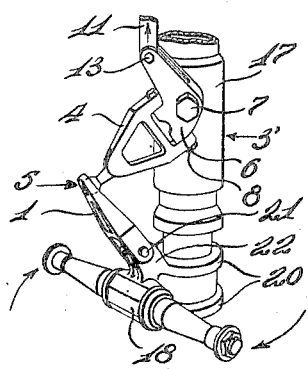
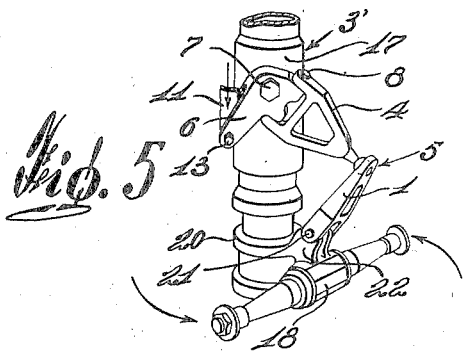
INVENTORS
John Peter FULLAM &
Stephan GYURIK
BY
ATTORNEYS

United States Patent Office 2,763,449
Patented Sept. 18, 1956

2,763,449

STEERING MECHANISM

John Peter Fullam and Stephan Gyurik, Montreal, Quebec, Canada, assignors to Jarry Hydraulics, Montreal, Quebec, Canada Application November 16, 1955, Serial No. 547,226

4 Claims. (Cl. 244—50)

The present invention relates to a steering mechanism and more particularly to such a mechanism for aircraft nose wheels.

The strut supporting the nose wheel or wheels of an aircraft usually embodies a shock absorbing device whereby the part of the strut on which the wheel is mounted is capable of reciprocating longitudinal movement with respect to the remaining part of the strut, said last named part being rigid with the aircraft in the operative position of the nose wheel.

The general object of the present invention is the provision of a steering mechanism for steering aircraft nose wheels of the character above mentioned.

An important object of the present invention is the provision of a steering mechanism of the character described which is of simple construction and which takes a minimum of space and which is partly mounted on the stationary portion of the shock absorbing device and partly connected to the movable portion of the shock absorbing device.

Yet another important object of the present invention is the provision of a steering mechanism of the character described which will maintain the nose wheel in an intended angular position irrespective of the reciprocating movement of said wheel and movable part of the shock absorbing device.

Still another important object of the present invention is the provision of a steering device of the character described which may be used for shock struts of the conventional type in which the nose wheel is directly mounted on the movable part of the shock strut, or which may be used in connection with the lever suspension type of nose wheels.

The foregoing and other important objects of the present invention will become more apparent during the following disclosure and by referring to the drawings in which:

Figure 2 is a front elevation of the steering mechanism in conjunction with the conventional shock strut type of nose wheel;

Figure 3 is a side elevation of the embodiment shown in Figure 2; and

Figures 4 and 5 are diagrammatic perspective views of the embodiment of Figure 2 shown in two different angular positions.

Figure 1:
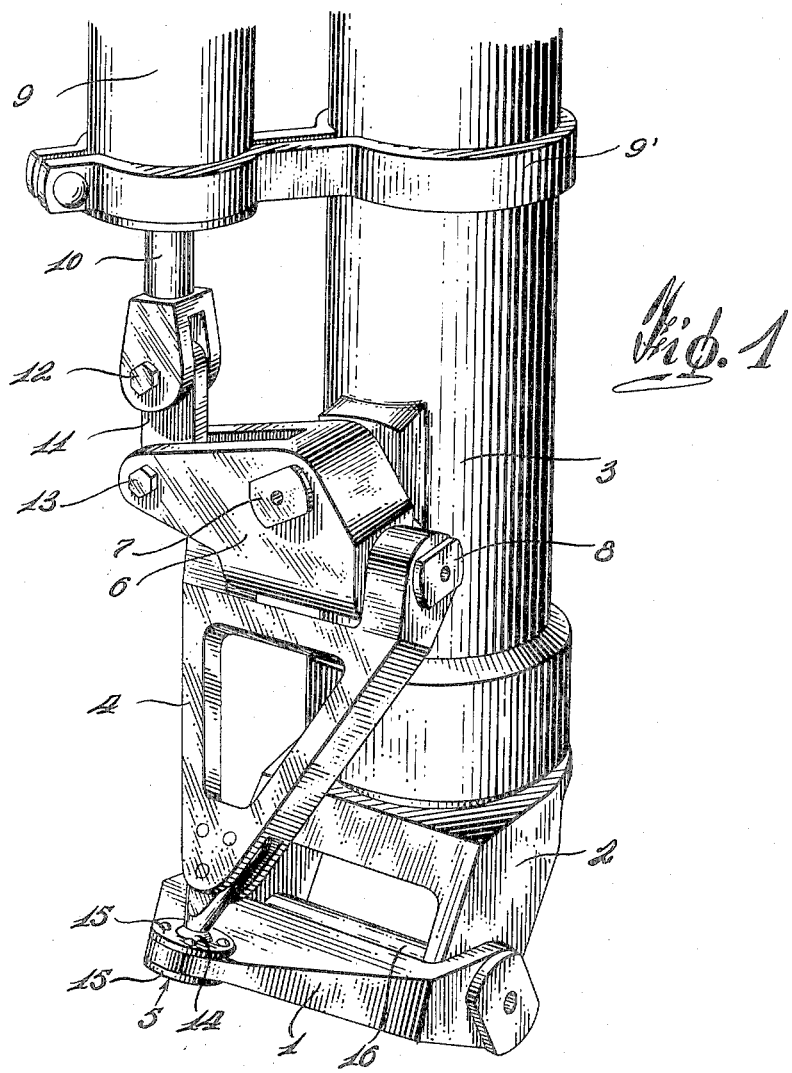
Figure 1 is a perspective view of the steering mechanism in conjunction with a lever suspension of the type of nose wheel.

Referring now more particularly to the drawings in which like reference characters indicate like elements throughout, the steering mechanism, according to the present invention, consists essentially of two links acting as torque arms, a universal joint attachment and an actuator. In the embodiment shown in Figure 1, the lower link 1 is attached free to rotate to a member 2 which is rotatable about a vertical axis in the leg 3 of the aircraft. The lower link 1 is attached to the upper link 4 by means of a universal ball joint 5. The upper link 4 is attached to the leg 3 through a universal joint consisting of a block 6 rotating around a stud shaft 7 which is secured and perpendicular to the leg 3. The upper link 4 is free to rotate with respect to the block 6 about a transversal axle 8 which is perpendicular to the shaft 7, and which is journalled in the block 6. The block 6 is pivoted about the stud shaft 7 through the means of actuator 9 which consists in an hydraulic cylinder and piston unit, the piston rod 10 of which is pivotally connected to the block 6 through the means of the intermediate link 11 which is pivoted to the piston rod 10 at 12 and to the block 6 at 13.

The universal ball joint 5 consists in a ball 14 formed at the apex of the triangularly shaped upper link 4 and which engages a hole made in the apex of the triangularly shaped lower link 1, and is retained within the said hole by means of two flat rings 15 riveted or otherwise secured on both sides of the link 1. The transversal axle 8 passes through the base of the triangularly shaped frame 4. Similarly the base of the triangular lower link 1 is connected to the member 2 by means of an axle 16. The member 2 is provided with an upwardly extending sleeve (not shown) entering the cylindrical leg 3 for movement of said member 2 about the longitudinal axis of the leg 3. In the operative position of the nose wheel the leg 3, together with the actuator 9 which is secured to said leg 3 by means of the bracket 9' is stationary. Actuation of the piston rod 10 will pivot the block 6 about the stud shaft 7 thereby causing the transversal axle 8 and base of the upper link 4 to pivot in a plane perpendicular to the leg 3. This movement will cause a corresponding movement of the universal ball joint 5 through a solid angle corresponding exactly to the extent of pivotal movement of the block 6 about the shaft 7. The displacement of the universal ball joint 5 will in turn cause the rotation of the member 2 by means of the lower link 1, through an angle equal to the solid angle travelled by the universal ball joint 5. In the embodiment of Figure 1, the nose wheel (not shown) is connected to the member 2 in a conventional manner by means of links (not shown) pivoted on the axle 16.

In the embodiment shown in Figures 2 to 5 inclusive, a pair of nose wheels (not shown) are mounted on the double wheel shaft 18 which is secured to a collar 20, itself mounted on the longitudinally movable and rotatable portion 19 of the strut or leg 3'. In this embodiment the lower link 1 is pivoted by means of axle 21 to ears 22 which are rigid with the collar 20. The stud shaft 7 is perpendicular to and rigidly secured to the stationary part 17 of the leg 3', while the remaining elements of the steering mechanism are identical to those described in connection with Figure 1.

As shown in Figures 4 and 5, rotation of the block member 6 by the actuator 9 about the stud shaft 7 will cause rotation of the collar 20 and wheel shaft 18 in a plane perpendicular to the leg 3' and a predetermined position of the actuator 9 will always correspond to a predetermined angular position of the wheel shaft 18 irrespective of the longitudinal position of the movable strut part 19 with respect to the stationary part 17 of the leg 3', said longitudinal position of the part 19 being taken care of by the more or less inclined position of the upper link 4 and lower link 1.

While preferred embodiments according to the present invention have been illustrated and described, it is understood that various modifications may be resorted to without parting from the spiirt and scope of the appended claims.

We claim:

1. A steering mechanism comprising, in combination with a longitudinally extensible leg member having a first part and a second part which is longitudinally and rotatably movable with respect to said first part, a block member pivotally mounted on said first part for rotation about an axis perpendicular to said first part, a first link pivotally connected to said block for movement about an axis transverse to and perpendicular to said first named axis, a second link pivoted on said second part for movement about a third axis perpendicular to the longitudinal axis of said leg member, a universal joint pivotally connecting said first and second links, and actuating means to rotate said block member about said first named axis to thereby rotate said second part through a corresponding angle in a plane perpendicular to the longitudinal axis of said leg member irrespective of the longitudinal position of said second part with respect to said first part.

2. A steering mechanism for the nose wheel assembly of an aircraft comprising, in combination with the shock strut of said aircraft, said shock strut comprising a first stationary elongated part and a second longitudinally movable and rotatable part, the nose wheel of said aircraft being mounted on said second part, a stud shaft secured to said first part and perpendicular to the longitudinal axis thereof, a block member mounted on said stud shaft for movement in a plane parallel to the longitudinal axis of said first part, a first link pivotally connected to said block member for pivotal movement about an axis perpendicular to said stud shaft, a second link pivotally mounted on said second part for movement about an axis perpendicular to the longitudinal axis of said shock strut, a universal ball joint pivotally connecting the free ends of said first and second links, said first and second links normally making an acute angle therebetween, and an actuator comprising a hydraulic cylinder rigidly secured to said stationary part and a piston having a piston rod pivotally connected to said block member for rotation thereof about said stud shaft and corresponding rotation of said second part in a plane perpendicular to the longitudinal axis of said shock strut.

3. A steering mechanism as claimed in claim 2, wherein said first and second links have a triangular shape, the apex of which are interconnected by means of said universal ball joint and the bases of which are pivotally connected to said block member and to said second part respectively.

4. A steering mechanism as claimed in claim 3, further including an intermediate link pivotally connecting the piston rod of said hydraulic actuator to said block member.

References Cited in the file of this patent
UNITED STATES PATENTS 2,424,233     Greenough _____ July 22, 1947
2,511,687     Andrews _____ June 13, 1950